United States Patent [19]

Katoh et al.

[11] Patent Number: 4,821,062
[45] Date of Patent: Apr. 11, 1989

[54] INTEGRATED ASSEMBLY OF THERMOSTAT AND THERMISTOR IN FIXING DEVICE OF IMAGE REPRODUCTION MACHINE

[75] Inventors: Itsuro Katoh; Akihiko Taniguchi, both of Nara; Yoshitaka Honda, Yamatokoriyama, all of Japan

[73] Assignee: Sharp Kabushiki Kaisha, Osaka, Japan

[21] Appl. No.: 888,411

[22] Filed: Jul. 23, 1986

[30] Foreign Application Priority Data

Jul. 23, 1985 [JP] Japan .................................. 60-163398

[51] Int. Cl.[4] ............................................. G03G 15/20
[52] U.S. Cl. ................... 355/3 FU; 219/216; 355/14 FU
[58] Field of Search ......... 355/3 FU, 14 FU; 219/216, 469–471, 494; 432/60, 228; 118/60

[56] References Cited

U.S. PATENT DOCUMENTS

| | | | |
|---|---|---|---|
| 3,211,893 | 10/1965 | Barlow et al. | 219/469 |
| 3,809,855 | 5/1974 | Neal | 219/471 X |
| 3,937,919 | 2/1976 | Clery et al. | 219/216 |
| 4,144,835 | 3/1920 | Fukase et al. | 118/667 |
| 4,425,494 | 1/1984 | Enomoto et al. | 219/216 |
| 4,533,231 | 8/1985 | Shigenobu | 355/14 FU Y |
| 4,541,708 | 9/1985 | Shigenobu | 355/3 FU |

FOREIGN PATENT DOCUMENTS

| | | |
|---|---|---|
| 2354374 | 10/1973 | Fed. Rep. of Germany . |
| 57-82874 | 5/1982 | Japan ......... 355/3 FU |
| 57-79974 | 5/1982 | Japan ......... 355/14 FU |
| 58-173772 | 10/1983 | Japan ......... 355/14 FU |

OTHER PUBLICATIONS

*IBM Technical Disclosure Bulletin*, vol. 21, No. 6, Nov. 1978, "Fuser Temperature Control Circuit", Ernst, et al., pp. 2228–2229, 355/3 FU.

Primary Examiner—Arthur T. Grimley
Assistant Examiner—J. Pendegrass
Attorney, Agent, or Firm—Birch, Stewart, Kolasch & Birch

[57] ABSTRACT

A heat fixing device for a image reproduction machine includes a heat roller having a heat source for heat fixing a toner image on a copy paper, a temperature sensing element for sensing the temperature of the heat roller, and a temperature control element responsive to the output of the temperature sensing element for controlling the power supply to the heat source. The temperature sensing element and the temperature control element are integrally combined.

4 Claims, 1 Drawing Sheet

INTEGRATED ASSEMBLY OF THERMOSTAT AND THERMISTOR IN FIXING DEVICE OF IMAGE REPRODUCTION MACHINE

BACKGROUND OF THE INVENTION

The present invention relates to an image reproduction machine such as an electrophotographic copying machine or printer and, more particularly, to the integrated assembly of a thermostat and a thermister of a fixing device in an image reproduction machine such as an electrophotographic copying machine or printer.

In a conventional fixing device in an image reproduction machine such as an electrophotographic copying machine or printer, a temperature control element such as a thermal fuse is conventionally provided for preventing an abnormal temperature increase in the fixing device. The fixing device is provided for fixing a toner image of a copy paper. The toner image is produced by a photoreceptor with toner particles. The toner image is then transferred onto the copy paper and fixed with the fixing device.

When the temperature of the fixing device increases over a stably operable temperature, the copy paper may be fired. To prevent the increase of temperature over the stably operable temperature, the thermal fuse should be provided. However, a suitable structure for the fixing device with the temperature control element easily assembled thereto and with a highly reliable control element has not been proposed.

SUMMARY OF THE INVENTION

Accordingly, it is an object of the present invention to provide an improved assembly for a heat fixing device with a temperature sensing element and a temperature control element for an image reproduction machine.

It is another object of the present invention to provide an improved assembly of a fixing heat device with the integral assembly of a thermistor and a thermostat with high reliability of the thermostat in an image reproduction machine such as an electrophotographic copying machine and printer.

Briefly described, in accordance with the present invention, a fixing device of an image reproduction machine such as an electrophotographic copying machine or printer comprises a heat roller including a heat source for fixing a toner image on a copy paper with the heat from the heat source, a temperature sensing element for detecting the temperature of the heat roller by controlling the supply of electric power to the heat source, and a temperature control element such as a thermostat for preventing the abnormal temperature increase in the heat roller. The temperature control element is integrally secured with the temperature sensing element.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
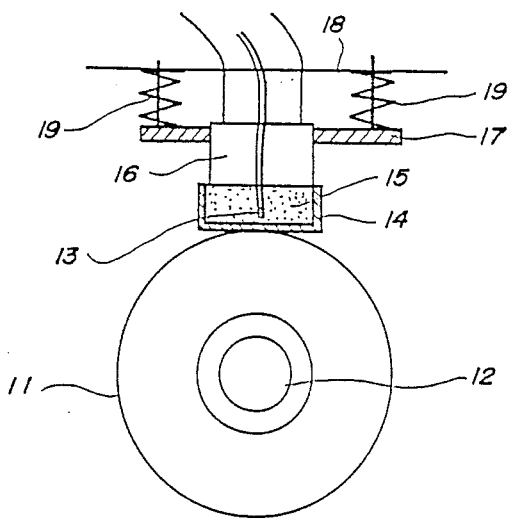
FIG. 1 is a cross-sectional view of a heat fixing device of an image reproduction machine.

FIG. 1 is a cross-sectional view of a heat fixing device for an image reproduction machine such as an electrophotographic copying machine or printer according to the present invention.

The heat fixing device of the present invention comprises a heat roller 11 coated with a heat resistive resin such as Teflon or the like. Within the heat roller 11, an inner heater 12 is provided for generating heat to the heat roller 11. A second roller (not shown) coated with, for example, a silicone rubber is forced against the heat roller 11. A copied paper passes through the clearance between the heat roller 11 and the second roller, during which a toner image is heat fixed onto the copied paper.

At the peripheral surface of the heat roller 11, a temperature sensing element such as a thermistor 13 and a tape 14 made of a heat resistive material such as Teflon or polyimide resin are provided. The thermistor 13 is provided for sensing the temperature of the heat fixing device, so that the surface temperature of the heat fixing device is controlled within a toner-fixable temperature range. The thermistor 13 is covered with a foaming silicone rubber 15 to shut out the surrounding environment. The tape 14 is adhered at the portion between the heat roller 11 and the thermistor 13 to thermally and mechanically protect the surface of the roller 11 from being damaged in the rotation direction of the roller 11.

According to the present invention, a temperature control element such as a thermostat 16 is integrally combined with the thermistor 13. The thermostat 16 is for preventing an abnormal temperature increase in the fixing device. The thermostat 16 is secured on a plate 17 for stressing the thermostat 16 and the thermistor 13 toward the surface of the heat fixing roller 11. The plate 17 is supported by a body frame 18 of the image reproduction machine and can electrically move toward the roller 11. A pair of springs 19 are provided for forcing the combination of the thermistor 13 and the thermostat 16 toward the heat roller 11.

Figure 2:
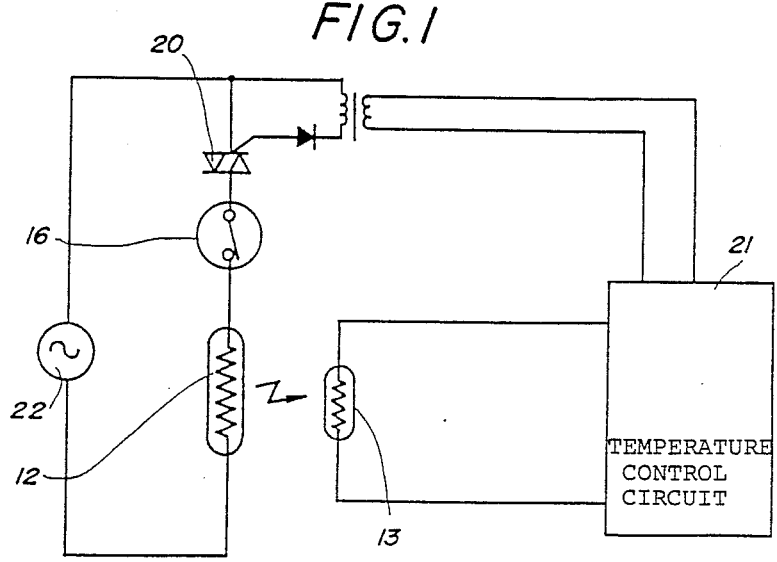
FIG. 2 is a block diagram of a heat control circuit for the heat fixing device of FIG. 1.

FIG. 2 is a block diagram of a temperature control circuit for the fixing device of the present invention.

The thermostat 16 has a normally-closing switch. The switch 16 is connected in series to the inner heater 12, while being coupled to a gate-controlled semiconductor switch (TRIAC) 20 which controls the supply of electric power. A control signal from a temperature control circuit 21 is applied to the gate of the TRIAC 20, so that an AC current is applied to the inner heater 12 via the TRIAC 20. The temperature control circuit 21 is responsive to the change in the resistance of the thermistor 13 to provide the control signal for controlling the supply of electric power to the heater 12. When the surface temperature of the heat roller 11 is below the toner-fixable temperature, the temperature control circuit 21 provides a control signal for supplying the AC current from an AC power source 22 to the heater 12. When the temperature is above the toner-fixable temperature, the temperature control circuit provides a control signal for switching off the TRIAC 20.

With the above-described arrangement, if the temperature control system comprising the temperature control circuit 21 becomes uncontrollable, the power supply to the heater 12 cannot be stopped. Such a condition may happen due to the fact that the TRIAC 20 is short-circuited, the thermistor 13 is damaged, or the temperature control circuit 21 is damaged. When the power supply to the heater 12 is continued, the surface temperature of the heat roller 11 increases over the toner-fixable temperature. Heat from the heat roller 11 via the forming silicone rubber 15 is transferred to the thermostat 16. Therefore, the switch of the thermostat 16 is rapidly opened, to stop the power supply to the heater 12.

Since the thermostat 16 is integrally combined with the thermistor 13, the thermostat 16 is secured simultaneously with the forcing of the thermistor assembly to the heat roller 11. No additional procedure of assembling the thermostat 16 is needed, which becomes smooth and simple. There is no fear of damaging the surface of the heat roller 11 owing to the assembly of the thermostat 16.

Further, in a specific type of heat fixing roller to which a silicone oil is added, the silicone oil can be penetrated into the silicone rubber 15 covering the thermistor 13 to enhance the heat transmission degree, so that the thermistor 13 can rapidly respond to the temperature change. It may be possible to preliminarily penetrate the silicone oil or the like to the forming silicone rubber 15.

While only certain embodiments of the present invention have been described, it will be apparent to those skilled in the art that various changes and modifications may be made therein without departing from the spirit and scope of the present invention as claimed.

What is claimed is:

1. A heat fixing device for an image reproduction machine comprising:

a heat source for providing heat to said heat fixing device;

a power source for providing power to said heat source;

a temperature sensing thermistor for sensing the temperature of said heat fixing device;

silicon rubber formed around at least a portion of said thermistor for protecting said thermistor from the surrounding environment;

a temperature control circuit, responsive to said temperature sensing thermistor, for generating signals representative of changes in resistance of said thermistor, said signals corresponding to varying temperatures being sensed;

means for applying power to said heat source in response to said signals generated by said temperature control circuit when the temperature of said heat fixing device is below a predetermined temperature, said signals being applied to said power source of said heat source;

a thermostat, integrally combined with said temperature sensing thermistor, for detecting an abnormal increase in the temperature of said heat fixing device upon failure or malfunction of at least one of said power source, said temperature sensing thermistor, and said temperature control circuit, whereby said thermostat interrupts said means for applying power to said heat source, thereby preventing damage to said heat fixing device; and wherein heat is transferred to said thermostat through said silicon rubber around said thermistor.

2. The heat fixing device according to claim 1, wherein said means for applying power is a TRIAC interposed between said temperature control circuit and said thermostat.

3. The heat fixing device according to claim 1, further including heat resistive material, formed between said silicone rubber and said heat fixing device, for thermally and mechanically protecting the surface of said heat fixing device upon rotation thereof, and means for elastically forcing said integrally combined thermostat and temperature sensing thermistor toward said heat fixing device.

4. The heat fixing device according to claim 3, wherein said heat resistive material is a tape made of heat resistive resin.

* * * * *